2 Sheets--Sheet 1.
E. MARTIN.
Milk-Coolers.
No. 144,343. Patented Nov. 4, 1873.
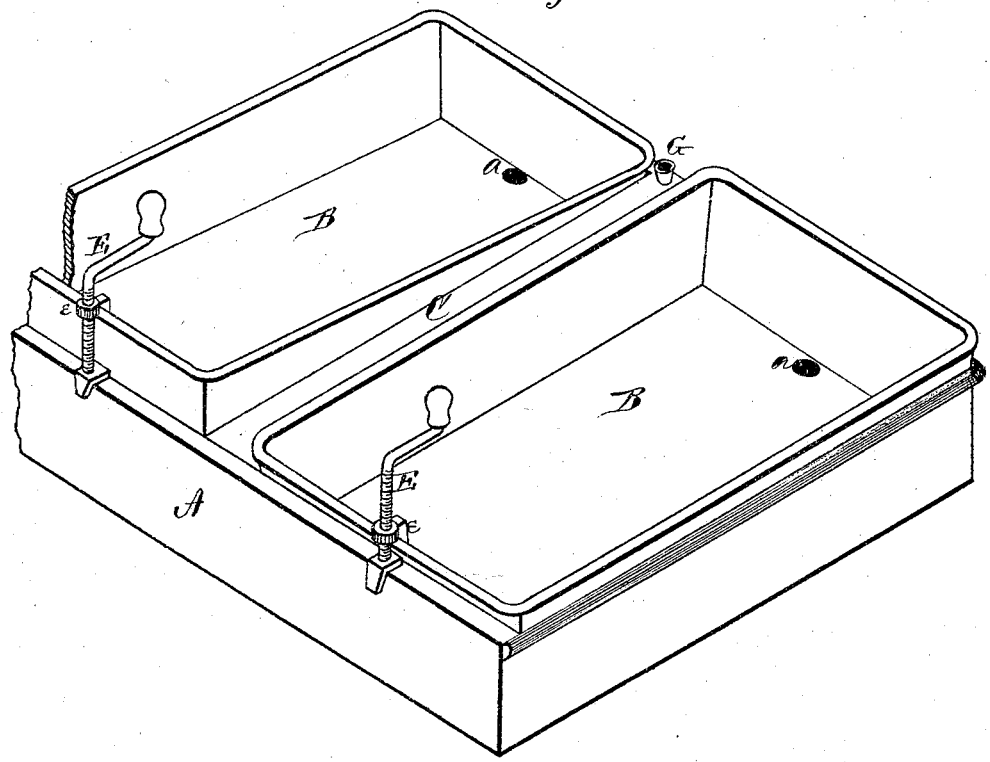
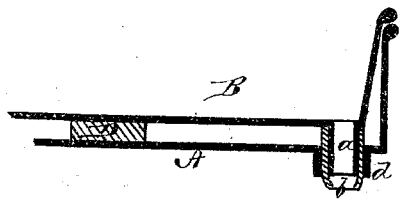
Witnesses:  
Inventor.  
Attorneys.

2 Sheets--Sheet 2.

E. MARTIN.
Milk-Coolers.

No. 144,343. Patented Nov. 4, 1873.

Witnesses: Inventor.
Franck L. Durand Edmond Martin
C. L. Evert per
 Alexander Martin
 Attorneys.

AM. PHOTO-LITHOGRAPHIC CO. N.Y. (OSBORNE'S PROCESS)

UNITED STATES PATENT OFFICE.

EDMOND MARTIN, OF POTSDAM, NEW YORK.

IMPROVEMENT IN MILK-COOLERS.

Specification forming part of Letters Patent No. 144,343, dated November 4, 1873; application filed March 27, 1873.

*To all whom it may concern:*

Be it known that I, EDMOND MARTIN, of Potsdam, in the county of St. Lawrence and in the State of New York, have invented certain new and useful Improvements in Milk-Pan; and do hereby declare that the following is a full, clear, and exact description thereof, reference being had to the accompanying drawings and to the letters of reference marked thereon making a part of this specification.

The nature of my invention consists in the construction and arrangement of a milk pan and cooler, as will be hereinafter more fully set forth.

In order to enable others skilled in the art to which my invention appertains to make and use the same, I will now proceed to describe its construction and operation, referring to the annexed drawings, in which—

Figure 2:
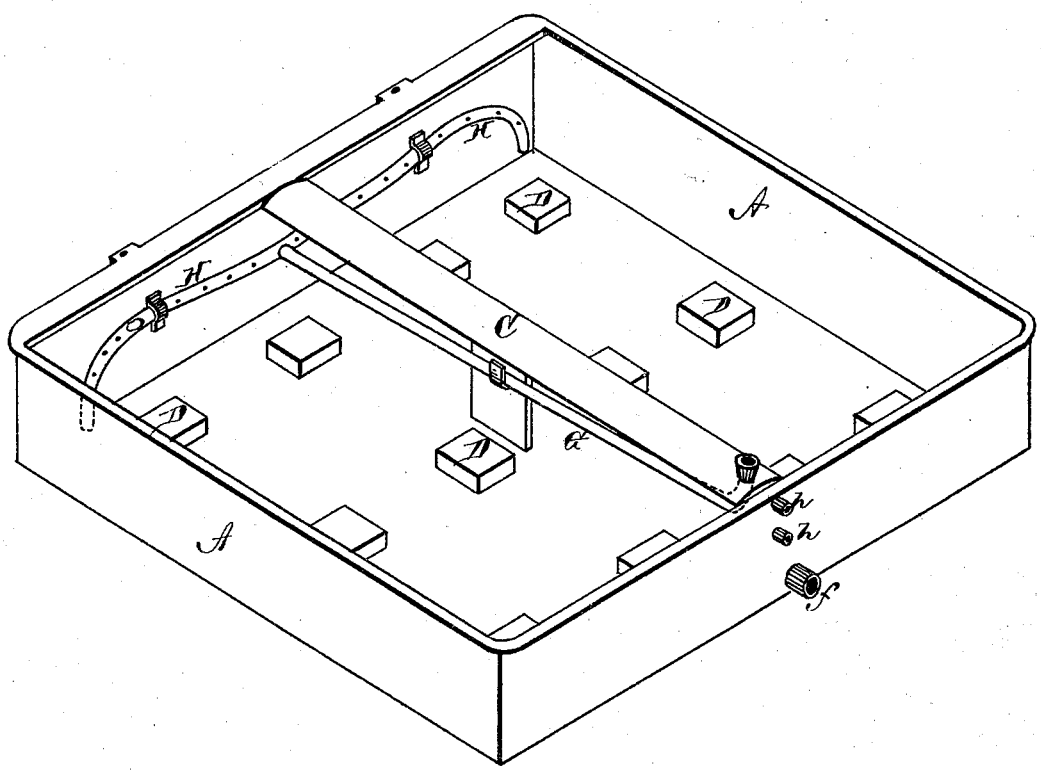
Figure 4:
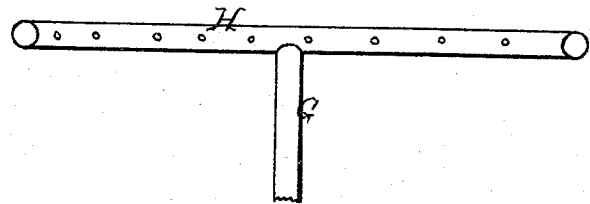

Figure 1 is a perspective view of my milk pan and cooler. Fig. 2 is a perspective view of the cooler alone. Fig. 3 shows a section of the pan and cooler, and Fig. 4 is a bottom view of a pipe used in the cooler.

A represents a pan or vat of any suitable dimensions, in which are placed two or more milk-pans, B B, the vat A being provided with one or more cross-bars, C, dividing the vat into suitable spaces for the milk-pans. The pans B B rest upon wooden blocks D D fastened in the bottom of the vat A, and fit tightly in said vat. Each milk-pan B is provided with a short outlet-pipe, *a*, in the bottom, at or near one end, and this outlet-pipe *a* is surrounded by a rubber tube, *b*, and the whole passed through a short tube, *d*, in the bottom of the vat A, the rubber thus forming a packing, and preventing the milk and water from running together; or, in other words, the milk may be drawn off without being obliged to draw off the water and at the same time preventing them from running together. At the other end of each pan B is an ear, *e*, through which a crank-screw, E, passes, the end of said screw bearing on the edge of the vat, by means of which the pan may be elevated or lowered to any position desired without even disturbing the milk in the pan. The water enters a tube, G, at one end of the vat, and said tube passes the entire length of the vat to the opposite end, where the water passes into branch-pipes H H, which are perforated on their under sides, thereby preventing the water from coming in direct attack against the pan. The cold water produces an equal effect upon the whole surface. *f* is a tube or outlet to draw off all the water in the vat, and *h h* are outlets at different heights, to allow the water to remain in the vat at any desired height and go no farther.

Having thus fully described my invention, what I claim as new, and desire to secure by Letters Patent, is—

1. The milk-pan B, provided at one end with screw E, substantially as and for the purposes herein set forth.

2. The combination of the vat A with blocks D D and pipes G H, the pan B with screw E, tubes *a d*, and rubber sleeve *b*, all constructed and arranged substantially as and for the purposes herein set forth.

In testimony that I claim the foregoing I have hereunto set my hand and seal this 6th day of March, 1873.

EDMOND MARTIN. [L. S.]

Witnesses:
 WM. GARLICK,
 ROBERT MARTIN.